US010318933B2

(12) United States Patent
Fukushima (10) Patent No.: US 10,318,933 B2
(45) Date of Patent: Jun. 11, 2019

(54) SETTLEMENT TERMINAL AND METHOD OF PROTECTING DATA STORED IN THE SETTLEMENT TERMINAL AGAINST TAMPERING

(71) Applicant: TOSHIBA TEC KABUSHIKI KAISHA, Tokyo (JP)

(72) Inventor: Takafumi Fukushima, Fuji Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 86 days.

(21) Appl. No.: 15/702,320

(22) Filed: Sep. 12, 2017

(65) Prior Publication Data

US 2018/0089640 A1 Mar. 29, 2018

(30) Foreign Application Priority Data

Sep. 23, 2016 (JP) .................................. 2016-185516

(51) Int. Cl.
| | |
|---|---|
| *G06Q 20/04* | (2012.01) |
| *G06F 21/55* | (2013.01) |
| *G06F 21/57* | (2013.01) |
| *G06F 8/654* | (2018.01) |
| *G06Q 20/20* | (2012.01) |
| *G06Q 20/32* | (2012.01) |
| *G06Q 20/34* | (2012.01) |
| *G06F 8/65* | (2018.01) |
| *G06Q 20/40* | (2012.01) |
| *G07F 7/10* | (2006.01) |

(52) U.S. Cl.
CPC ............... *G06Q 20/04* (2013.01); *G06F 8/65* (2013.01); *G06F 8/654* (2018.02); *G06F 21/554* (2013.01); *G06F 21/572* (2013.01); *G06Q 20/206* (2013.01); *G06Q 20/32* (2013.01); *G06Q 20/347* (2013.01); *G06Q 20/403* (2013.01); *G07F 7/1075* (2013.01)

(58) Field of Classification Search
CPC .................................................. G06Q 20/3821
USPC ......................................... 235/380, 449, 379
See application file for complete search history.

(56) References Cited

U.S. PATENT DOCUMENTS 7,451,919 B2 * 11/2008 Savage ................... G07F 19/20
                                                        235/379
7,837,110 B1 * 11/2010 Hess ....................... G06K 7/084
                                                        235/449

(Continued)

*Primary Examiner* — Allyson Trail
(74) *Attorney, Agent, or Firm* — Kim & Stewart LLP (57) ABSTRACT

A settlement terminal includes a card reader, a settlement processing unit including a processor programmed to carry out a settlement process using information acquired through the card reader and a tampering detection process, a storage device in which a first set of programs is stored after encryption by a first key and a second set of programs is stored after encryption by a second key, each set of programs including a first program for operating the card reader, and a second program for carrying out the settlement process. Upon detection of tampering, the processor of the settlement processing unit notifies an external terminal of the tampering and upon receiving an update instruction from the external terminal, updates a current set of programs used for operating the card reader and carrying out the settlement process from the first set to the second set.

18 Claims, 7 Drawing Sheets

(56) References Cited

U.S. PATENT DOCUMENTS

| | | | |
|---|---|---|---|
| 2003/0226042 A1 | 12/2003 | Fukushima | |
| 2017/0061167 A1* | 3/2017 | McNicoll | G06K 7/0095 |
| 2017/0061746 A1* | 3/2017 | Tanaka | G07G 1/0018 |
| 2018/0039983 A1* | 2/2018 | Eisen | G06Q 20/34 |
| 2018/0130040 A1* | 5/2018 | Nuzum | G06Q 20/204 |
| 2018/0130052 A1* | 5/2018 | Eisen | G06Q 20/3821 |

* cited by examiner

SETTLEMENT TERMINAL AND METHOD OF PROTECTING DATA STORED IN THE SETTLEMENT TERMINAL AGAINST TAMPERING

CROSS-REFERENCE TO RELATED APPLICATION

This application is based upon and claims the benefit of priority from Japanese Patent Application No. 2016-185516, filed Sep. 23, 2016, the entire contents of which are incorporated herein by reference.

FIELD

Embodiments described herein relate generally to a settlement terminal and a method of protecting data stored in the settlement terminal against tampering.

BACKGROUND

In various settlement terminals, e.g., a card settlement terminal which carries out the settlement of a transaction by a credit card, tampering can occur to change the terminal to output recorded information used for a settlement, such as the credit card information read from a credit card. For this reason, various events serving as signs of changes to the terminal, such as forcibly opening a housing, are monitored, and in a case in which such an event occurs, the terminal is prevented from operating normally thereafter by deleting a program or the data necessary for the normal operation thereof.

However, if the configuration of the tamper detection technology is known, it is possible to avoid detection of tampering relatively easily. Further, in a case in which a treatment such as deleting a program, or the taking of data occurs, if the deleted program or data is not restored, the normal operation of the terminal cannot be restored.

DETAILED DESCRIPTION

In accordance with an embodiment, a settlement terminal comprises a card reader, a settlement processing unit including a processor programmed to carry out a settlement process using information acquired through the card reader and a tampering detection process, a storage device in which a first set of programs is stored after encryption by a first key and a second set of programs is stored after encryption by a second key, each set of programs including a first program for operating the card reader, and a second program for carrying out the settlement process. Upon detection of tampering, the processor of the settlement processing unit notifies an external terminal of the tampering and upon receiving an update instruction from the external terminal, updates a current set of programs used for operating the card reader and carrying out the settlement process from the first set to the second set.

Hereinafter, embodiments are described with reference to the accompanying drawings. Furthermore, in the present embodiment, a settlement terminal that processes a settlement by a credit card is described as an example.

First Embodiment

Figure 1:
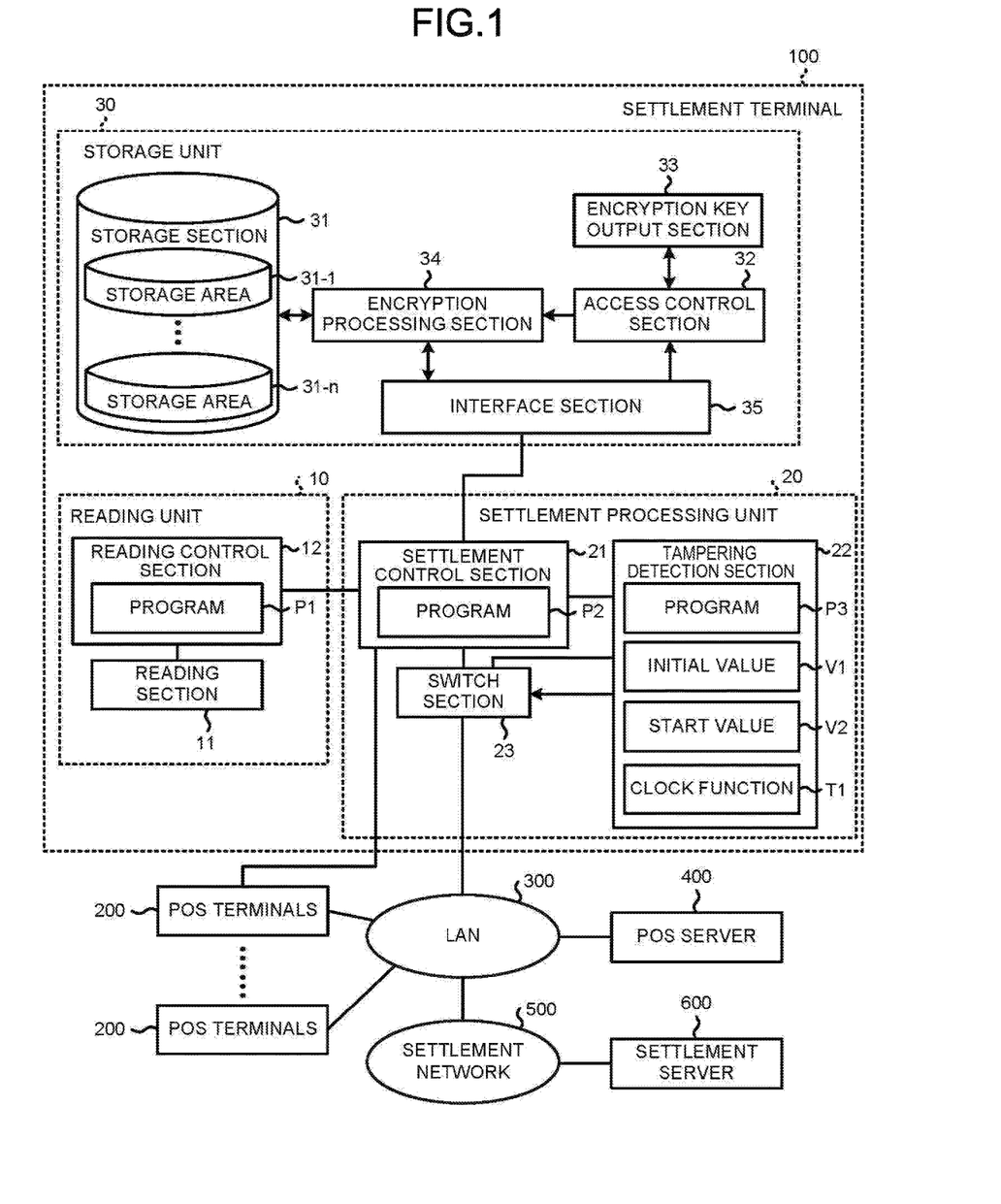
FIG. 1 is a block diagram illustrating main circuit elements of a settlement terminal according to a first embodiment.

FIG. 1 is a block diagram illustrating main circuit elements of a settlement terminal 100 according to the first embodiment. The settlement terminal 100 includes a reading unit 10, a settlement processing unit 20 and a storage unit 30. Furthermore, although not shown, the settlement terminal 100 further includes units provided in other settlement terminals of the same type, such as a printing unit and a user interface unit.

The reading unit 10 includes a reading section 11 and a reading control section 12. The reading section 11 reads card data recorded in a credit card presented thereto. A known device including therein, for example, a magnetic card reader, can be used as the reading section 11. The reading section 11 is an example of a reading module. The reading control section 12 encrypts the card data read by the reading section 11 and then sends the encrypted card data to the settlement processing unit 20. Therefore, the reading control section 12 includes an encryption module and a sending module to perform the encryption and sending functions. The reading control section 12 includes, for example, a microcomputer unit and includes a processor and a memory. A reading program P1 is stored in the memory. The processor executes processing based on the reading program P1 to realize operations of the reading control section 12.

The settlement processing unit 20 includes a settlement control section 21, a tampering detection section 22 and a switch section 23. The settlement control section 21 includes, for example, a microcomputer unit and includes a processor and a memory. A settlement program P2 is stored in the memory. The processor executes processing using the settlement program P2 to perform the operations of the settlement control section 21.

The tampering detection section 22, the reading unit 10, the storage unit 30 and POS (point-of-sale) terminals 200 are respectively connected with the settlement control section 21. The settlement control section 21 acquires transaction data indicating a settlement amount relating to a transaction, serving as an object of a settlement, from the POS terminal 200. The settlement control section 21 receives the encrypted card data sent by the reading unit 10, and decodes the encrypted card data. The settlement control section 21 encrypts settlement data including transaction data and card data by a method set by a settlement service that is provided by a settlement server 600. The settlement control section 21 sends the encrypted settlement data to a LAN (Local Area Network) 300 connected therewith via the switch section 23 and to the settlement server 600. In this way, a request for a settlement to the settlement system including the settlement server 600 is made. The settlement control section 21 receives the result of settlement based on the settlement data and controls the printing unit to print a paper slip representing the settlement result on the basis of response data sent from the settlement server 600. Further, the settlement control section 21 carries out processing, as described later herein, for updating the reading program P1 of the reading control section 12 and the settlement program P2 of the settlement control section 21.

The tampering detection section 22 includes, for example, a microcomputer unit and includes a processor and a memory. A tampering detection program P3 is stored in the memory. Then, the processor executes processing based on the tampering detection program P3 to realize the operations of the tampering detection section 22. The tampering detection section 22 acquires an IP address assigned to the settlement terminal 100 from the LAN 300 and carries out processing described later herein for detecting change in the connection state to the LAN 300 of the settlement terminal 100 on the basis of the IP address. Further, the memory stores an initial value V1 and a start value V2, as will be described herein. The tampering detection section 22 further includes a clock function T1 which continuously carries out a clocking operation to obtain the current date and time.

The switch section 23 is a switching circuit that selectively connects the settlement control section 21 and the tampering detection section 22 to the LAN 300 in response to the switch signal applied from the tampering detection section 22. Furthermore, although not shown, the settlement processing unit 20 includes various interface sections for transmitting and receiving data between each of the reading unit 10 and the storage unit 30 and the settlement control section 21. Further, the settlement processing unit 20 includes an interface section for transmission and reception of data by the settlement control section 21 and the tampering detection section 22 via the LAN 300.

The storage unit 30 includes a storage section 31, and control circuitry such as an access control section 32, an encryption key output section 33, an encryption processing section 34, and an interface section 35. The storage section 31 stores program files and data files, and includes, for example, an EEPROM (Electric Erasable Programmable Read-only Memory), an HDD (Hard Disk Drive), an SSD (Solid State Drive) and the like. The storage section 31 can logically set one, or a plurality of, storage areas. FIG. 1 shows a state in which n storage areas 31-1 to 31-*n* are set as an example. Each of the storage areas 31-1 to 31-*n* is an area for storing an encrypted file. Although not shown, areas other than the storage areas 31-1 to 31-*n* are also set in the storage section 31. One of such areas is a pre-boot authentication area that stores a program file for pre-boot authentication processing. Further, one of such areas is an area that stores a program file for program update processing by the settlement control section 21.

The access control section 32 manages which of a locked state and an unlocked state is set for each of the storage areas 31-1 to 31-*n*. In a case in which anyone of respective addresses of the storage areas 31-1 to 31-*n* and an access key determined for the storage area of the address are supplied from the interface section 35, the access control section 32 switches between the locked state and the unlocked state of the corresponding storage area. In a case of setting a storage area to the unlocked state, the access control section 32 acquires an encryption key predetermined for the storage area from the encryption key output section 33, and sets the encryption key in the encryption processing section 34. In a case of setting some storage area to the locked state, the access control section 32 clears the encryption key set in the encryption processing section 34 as described above.

The encryption key output section 33 supplies an encryption key corresponding to a storage area designated by the access control section 32 to the access control section 32. The encryption key output section 33 may store each of the encryption keys, generated in advance, for each of the storage areas, or may carry out calculation with, for example, a specific calculation formula such as a hash function on the basis of information applied from the access control section 32.

In a case in which writing of a file into a designated storage area in which a corresponding encryption key is set is requested, the encryption processing section 34 encrypts the file using the set encryption key described above. Then, the encryption processing section 34 writes the encrypted file into the designated storage area. In a case in which reading of a file from a designated storage area in which a corresponding encryption key is set is requested, the encryption processing section 34 decodes (i.e., decrypts) the file using the set encryption key described above. Then, the encryption processing section 34 outputs the decoded file to the interface section 35. If the encryption key corresponding to the designated storage area is not set, the encryption processing section 34 denies the requests for writing or reading.

The interface section 35 supplies an address, and an access key sent from the settlement control section 21 of the settlement processing unit 20, to the access control section 32. The interface section 35 supplies the request for the reading or the writing of the file from the settlement control section 21 to the encryption processing section 34. The interface section 35 supplies the decoded file from the encryption processing section 34 to the settlement control section 21. As the interface section 35, for example, a device based on a general-purpose interface standard, such as an SATA (Serial Advanced Technology Attachment) interface device, can be used.

Figure 2:
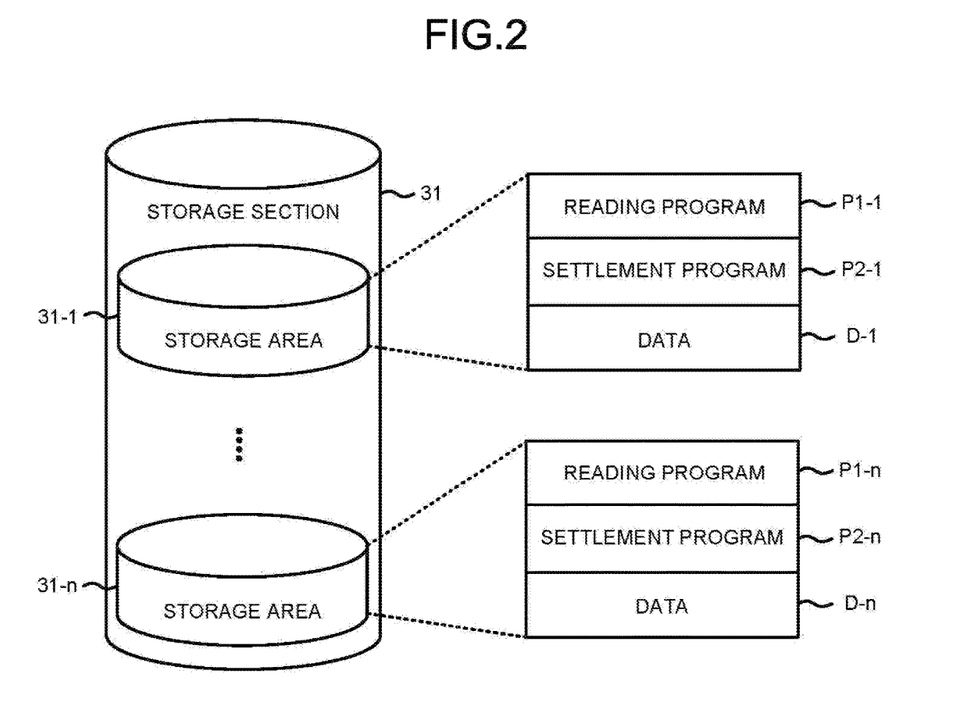
FIG. 2 is a diagram illustrating a storage state of a file in a storage area shown in FIG. 1.

FIG. 2 is a diagram illustrating a storage state of files in the storage areas 31-1 to 31-*n*. Each of the storage areas 31-1 to 31-*n* stores a group of program files, each group consisting of a corresponding one of reading programs P1-1 to P1-*n*, a corresponding one of settlement programs P2-1 to P2-*n*, and a corresponding one of data files D-1 to D-*n*. The reading program and the settlement program stored in one of the storage areas 31-1 to 31-*n* are assigned the same encryption key. The data file stored in one of the storage areas 31-1 to 31-*n* includes data used in a processing operation based on the reading program or the settlement program stored in the same storage area.

The LAN 300 may be constituted as either a wired LAN or a wireless LAN, or a combination of a wired LAN and a wireless LAN. Furthermore, the LAN 300 may be replaced with another type of communication network such as an optical communication network or a Bluetooth® or combined therewith. In other words, the LAN 300 can be replaced with any communication network as long as the identifier of a device serving as a sending source is included in transmitted data therefrom. In other words, the LAN is an example of the communication network.

A plurality of POS terminals 200 belonging to one POS system are connected to the LAN 300 in order to communicate with a POS server 400 belonging to the same POS system. In a case of allowing a card settlement, a POS terminal 200 which is not connected to the shown settlement terminal 100 is connected with a different settlement terminal 100 from the shown one without using the LAN 300. In other words, only one settlement terminal 100 is shown in FIG. 1; however, the POS system may be constituted as including a plurality of settlement terminals 100 being respectively connected with other POS terminals 200.

Next, the operations of the settlement terminal 100 constituted as described above are described. Furthermore, the contents of the processing described below are one example, and various processing capable of obtaining the same result can be suitably utilized.

If the settlement terminal 100 is started, the settlement control section 21 reads a program for program update processing from the storage section 31, and starts processing based on the program.

Figure 3:
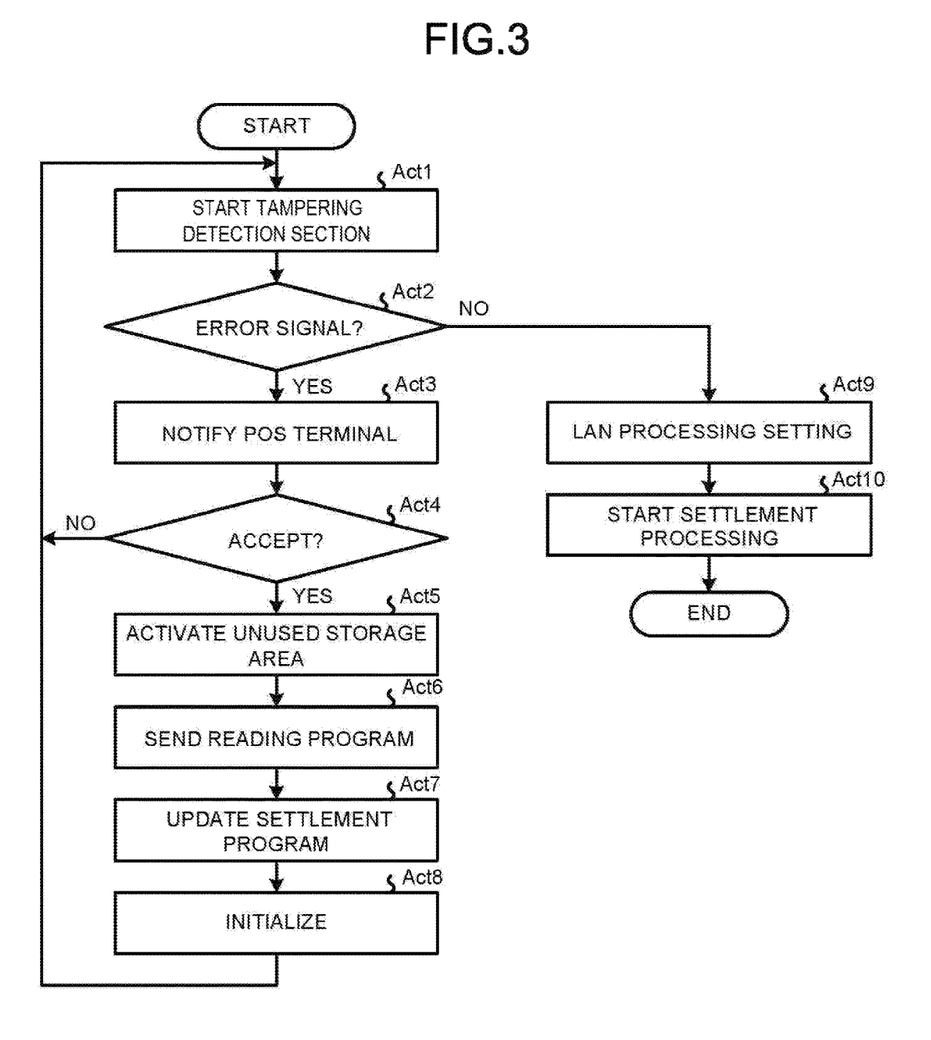
FIG. 3 is a flowchart illustrating an operation of a settlement control section shown in FIG. 1.

FIG. 3 is a flowchart of the program update processing by the settlement control section 21. The settlement control section 21 starts the tampering detection section 22 by outputting an operation start signal to the tampering detection section 22 (Act 1).

Figure 4:
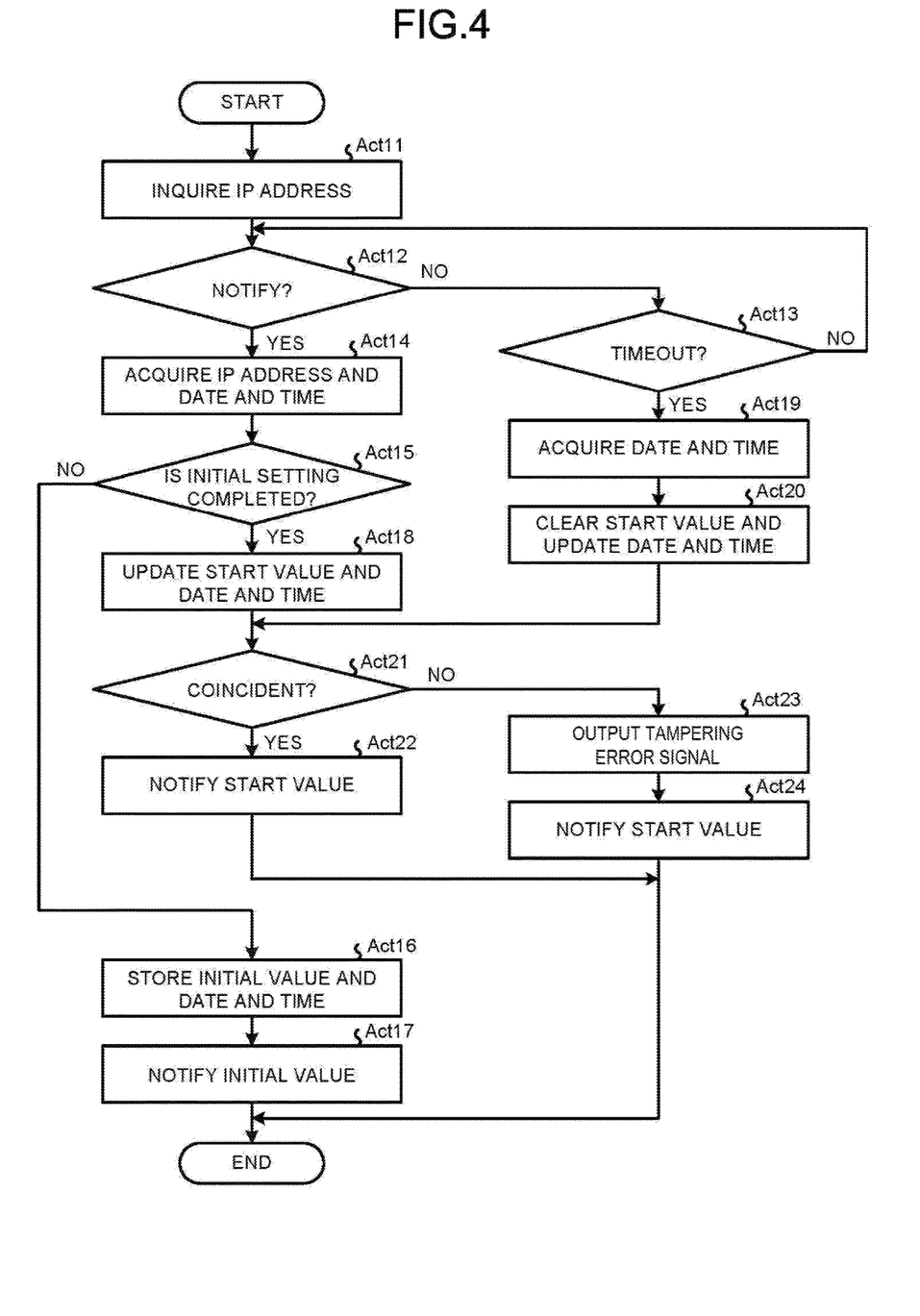
FIG. 4 is a flowchart illustrating an operation of a tampering detection section shown in FIG. 1.

The tampering detection section 22 starts processing based on a tampering detection program P3 if the foregoing operation start signal arrives. The processing based on the tampering detection program P3 by the tampering detection section 22 is illustrated in the flowchart of FIG. 4.

The tampering detection section 22 inquires the LAN 300 about an IP address (Act 11). Furthermore, the tampering detection section 22 sets a switch signal to a Low level at this time. If the switch signal is the Low level, the switch section 23 selects communication with the tampering detection section 22. Thus, the tampering detection section 22 is in a state of being connected with the LAN 300 through the switch section 23.

The tampering detection section 22 confirms whether or not the IP address is notified (i.e., received) from the LAN 300 (Act 12). Then, the tampering detection section 22 follows the No path if the IP address is not received, and proceeds to the processing in Act 13. There, the tampering detection section 22 confirms whether or not the standby time for receipt of the IP address notification is timed out (Act 13). Then, the tampering detection section 22 returns to the processing Act 12 if the standby time for receipt of the IP address has not timed out. The standby time may be optionally set by, for example, the creator of the tampering detection program P3 or the manager of the settlement terminal 100. In this way, the tampering detection section 22 waits for the IP address to be received until the standby time reaches the end of the standby time period (Act 12 and Act 13). The tampering detection section 22 follows the Yes path from the processing in Act 12 if the IP address is received during the standby time period, and proceeds to a processing in Act 14.

The tampering detection section 22 acquires the IP address and date and time obtained by the clock function T1 at this point of time (Act 14). Furthermore, the received IP address indicates that a terminal identified by the IP address is connected with the LAN 300, and thus is one of network information relating to the constitution of the LAN 300 as the communication network.

The tampering detection section 22 confirms whether or not initial setting of the IP address is completed (Act 15). Whether or not the initial setting is completed is managed with a flag by, for example, the settlement control section 21, and notified by the operation start signal. The tampering detection section 22 follows the No path if the initial setting is not completed after receipt of the notification, and proceeds to the processing in Act 16.

The tampering detection section 22 sets the IP address acquired in the processing in Act 14 as the initial value V1, associates the IP address with the date and time it was acquired in the processing in Act 14, and stores the IP address and the date and time in the memory of the tampering detection section 22 (Act 16). The tampering detection section 22 notifies the settlement control section 21 of the initial value V1 stored as described above (Act 17). Then, the tampering detection section 22 ends the processing shown in FIG. 4.

On the other hand, if the tampering detection section 22 starts the processing of FIG. 4 in response to re-starting of the settlement terminal 100 after the setting of the initial value V1 as above, the completion of the initial setting is notified by the operation start signal. The tampering detection section 22 follows the Yes path in the processing in Act 15 on the basis of this notification, and proceeds to the processing in Act 18. The tampering detection section 22 updates the start value V2 with the IP address acquired in the processing in Act 14, and stores the date and time acquired in the processing in Act 14, in association with the start value V2, in the memory of the tampering detection section 22 (Act 18). The tampering detection section 22 proceeds to the processing in Act 21 after that.

Referring back to Act 13, the tampering detection section 22 takes the Yes path from the processing Act 13 if the standby time period times out without receiving notification of the IP address, and proceeds to the processing in Act 19. The tampering detection section 22 acquires the date and time obtained by the clock function T1 at that point in time (Act 19). The tampering detection section 22 clears the start value V2, and updates the date and time associated with the start value V2 with the acquired date and time described above (Act 20). The tampering detection section 22 proceeds to the processing in Act 21 after that.

In Act 21, the tampering detection section 22 confirms whether or not the initial value V1 and the start value V2 are coincident. Then, the tampering detection section 22 follows the Yes path if both the values are coincident, and proceeds to the processing in Act 22. The tampering detection section 22 notifies the settlement control section 21 of the start value V2 (Act 22). Then, the tampering detection section 22 ends the processing shown in FIG. 4 as a result. However, the tampering detection section 22 follows the No path in the processing in Act 21 if the initial value V1 and the start value V2 are not coincident, and proceeds to the processing in Act 23. The tampering detection section 22 sends a tampering error signal to the settlement control section 21 (Act 23). The tampering detection section 22 notifies the settlement control section 21 of the start value V2 (Act 24). Then, the tampering detection section 22 ends the processing in FIG. 4 as a result.

The tampering detection section 22 changes the switch signal to a High level at the time of ending the processing shown in FIG. 4. The switch section 23 selects the settlement control section 21 if the switch signal is at the High level. Thus, the switch state is changed from one that indicates the tampering detection section 22 is connected with the LAN 300 to one that indicates the settlement control section 21 is connected with the LAN 300.

Referring back to FIG. 3, the settlement control section 21 proceeds to the processing in Act 2 after starting the tampering detection section 22 in Act 1. The settlement control section 21 confirms whether or not the tampering error signal has been output as described above (Act 2). Then, the settlement control section 21 takes the Yes path if the tampering error signal has been output, and proceeds to the processing in Act 3.

The settlement control section 21 provides an error notification to the POS terminal 200 connected with the settlement control section 21 (Act 3). If the POS terminal 200 receives the notification, the POS terminal 200 carries out an operation to display a message requesting the operator to update the settlement program (or refuse to update the program) since it is possible that some unauthorized conduct with respect to the settlement terminal 100, such as tampering, has occurred. Thereafter, the POS terminal 200 receives a confirmation operation by the operator to update settlement program. Then, the POS terminal 200 notifies the settlement control section 21 of the content of the confirmation operation if the confirmation operation is carried out.

The settlement control section 21 confirms whether or not the foregoing operation of the message for accepting the update was carried out (Act 4). Then, the settlement control section 21 takes the No path if the foregoing operation of the message for refusing the update is carried out, or the predetermined standby time is timed out while there is no notification of the confirmation operation, and returns to the processing in Act 1 without executing processing in Act 5 to Act 8. Alternatively, the settlement control section 21 takes the Yes path to the processing in Act 4 if the foregoing operation of the message for accepting the update is carried out, and proceeds to the processing in Act 5 according to the operation procedures as guided previously by the operator.

The settlement control section 21 activates one of the unused storage areas among the storage areas 31-1 to 31-n (Act 5). Unused means that the reading program stored in that storage area is not written into its reading control section 12 as the reading program P1. The settlement control section 21 specifically manages the storage areas and selects one of the storage areas which was not activated in the past, and thereby the information therein. Then, the settlement control section 21 applies the address of the selected storage area and the access key associated with the storage area to the interface section 35. Then, in the storage unit 30, the selected storage area is set to the unlocked state and activated through the foregoing function of each section.

The settlement control section 21 sends the reading program stored in the activated storage area to the reading control section 12 (Act 6). At this time, it is preferable that the settlement control section 21 encrypts the reading program and sends the encrypted reading program. If the reading program is sent from the settlement control section 21 in this way, the reading control section 12 writes the reading program into the memory of the reading control section 12 as the reading program P1. In other words, the reading control section 12 updates the reading program P1.

The settlement control section 21 writes the settlement program stored in the activated storage area into the memory of the settlement control section 21 as the settlement program P2 (Act 7). In other words, the settlement control section 21 updates the settlement program P2.

The settlement control section 21 initializes a monitoring state of a network constitution (Act 8). Specifically, the settlement control section 21 notifies the POS terminal 200 of the abnormal event date and time so that the history of the program update can be managed by the POS terminal 200. Then, the settlement control section 21 sets the flag for managing whether or not the initial setting is completed, to a state indicating that the initial setting is not complete. Furthermore, at this time, the settlement control section 21 may instruct the tampering detection section 22 to clear the initial value V1 and the start value V2.

After that, the settlement control section 21 returns to the processing in Act 1. In this way, the settlement control section 21 enables the tampering detection section 22 to carry out the initial setting, and the IP address assigned to the settlement terminal 100 is stored in the memory of the tampering detection section 22 as the initial value V1 at the time of the update of the program. In other words, a function as an update module is realized through cooperation of the settlement control section 21 and the tampering detection section 22.

Then, the settlement control section 21 process follows the No path in the processing in Act 2 in FIG. 3 if the initial value or the start value is notified in a state in which the tampering error signal is not received, in other words, if the initial value or the start value in Act 17 or Act 22 in FIG. 4 is notified, and proceeds to the processing in Act 9. The settlement control section 21 sets the IP address indicated by the notified initial value or start value as information for LAN processing for communication via the LAN 300 (Act 9). Further, the settlement control section 21 sets information, necessary for the LAN processing, which relates to the network environment and the network constitution for the LAN processing. The information is, for example, a MAC address of a LAN interface section (not shown) arranged between the LAN 300.

The settlement control section 21 starts a settlement processing based on the settlement program P2 (Act 10). Then, the settlement control section 21 ends the processing shown in FIG. 3.

Next, the effect of unauthorized conduct related to the settlement terminal 100, such as improperly taking out the settlement terminal 100 by an unauthorized person outside business hours from a store where the settlement terminal 100 is originally located, and returning the settlement terminal 100 to the foregoing store after the program file is analyzed or changed, is described.

Here, the settlement terminal 100 is disconnected from the LAN 300 and is removed from a store where the settlement terminal 100 is originally located by an unauthorized person. Then, after the settlement terminal 100 is returned to the foregoing store and reconnected to the LAN 300, when the settlement terminal 100 is started, a new IP address different from the IP address thereof before the disconnection from the LAN 300 is assigned to the settlement terminal 100.

Thus, the initial value V1 indicating the IP address assigned before the disconnection from the LAN 300 and the start value V2 indicating the IP address assigned after the reconnection with the LAN 300 are different values. Then, as a result, the tampering detection section 22 determines that the initial value V1 and the start value V2 are not coincident in the processing in Act 21 in FIG. 4, and the reading program P1 of the reading control section 12 and the settlement program P2 of the settlement control section 21 are updated to new programs from storage 31 which have not been previously used. Thus, analysis and change of the reading program P1 and the settlement program P2 carried out by the unauthorized person before such program update is carried out will become meaningless, and even if such unauthorized conduct occurs, damage caused by the unfair conduct can be avoided. Furthermore, according to the settlement terminal 100, since the reading program P1 and the settlement program P2 are immediately updated at the time of the starting of the settlement terminal 100, there is hardly any time period during which the settlement terminal 100 cannot be used after a tampering incident has occurred.

Further, in a case in which the settlement terminal 100 disconnected from the LAN 300 is connected with another LAN by the unauthorized person, a new IP address different from the IP address before the disconnection from the LAN 300 is assigned to the settlement terminal 100. In this case, since the POS terminal 200 is disconnected from the settlement terminal 100 as well, as long as other POS terminals are not connected, the operation of the message for accepting the update of the program is not sent from the POS terminal to the settlement terminal 100. Thus, in this case, the update of the program is not carried out. However, furthermore, at the time of the reconnection with the LAN 300, since the reading program P1 and the settlement program P2 are updated in the same way as above, the same effect as the above is achieved.

Furthermore, if the POS terminal is connected with the settlement terminal 100 by the unauthorized person and the operation of the message for accepting the update of the program is carried out as well, the reading program P1 and the settlement program P2 are updated again with respect to the single act of unauthorized conduct described above. On the contrary, as described above, the program is not updated in a case in which the operation of the message for accepting the update of the program is not carried out, and in this way, the reading program and the settlement program stored in each of the storage areas 31-1 to 31-$n$ can be used effectively.

Second Embodiment

Figure 5:
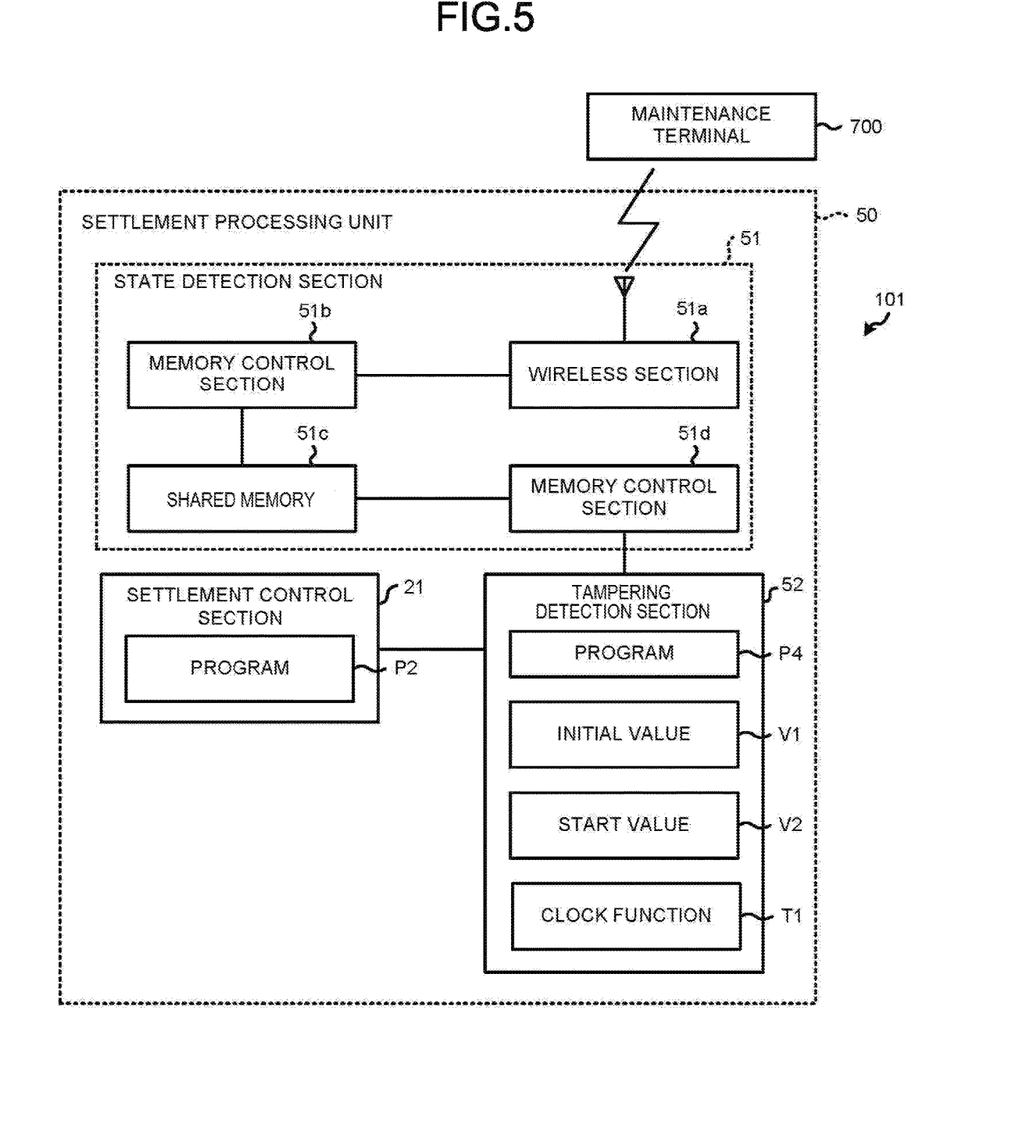
FIG. 5 is a block diagram illustrating main circuit elements of a settlement terminal according to a second embodiment.

FIG. 5 is a block diagram illustrating main circuit elements of a settlement terminal 101 according to the second embodiment. Furthermore, the components of the settlement terminal 101 are different from that of the settlement terminal 100 in that a settlement processing unit 50 is included instead of the settlement processing unit 20. Thus, FIG. 5 only illustrates the components of the settlement processing unit 50. The same elements in FIG. 5 as these shown in FIG. 1 are applied with the same reference numerals, and detailed descriptions thereof are omitted.

The settlement processing unit 50 includes the settlement control section 21, a state detection section 51 and a tampering detection section 52. In other words, the settlement processing unit 50 includes the tampering detection section 52 instead of the tampering detection section 22 in the first embodiment, and additionally includes the state detection section 51. The state detection section 51 includes a wireless section 51$a$, a memory control section 51$b$, a shared memory 51$c$ and a memory control section 51$d$, all of which are implemented as control circuitry in one example.

The wireless section 51$a$ wirelessly communicates with a maintenance terminal 700. The wireless section 51$a$ carries out authentication of the maintenance terminal 700 on the basis of RF data received through the communication with the maintenance terminal 700. The wireless section 51$a$ instructs the memory control section 51$b$ to rewrite mode data stored in the shared memory 51$c$ in a case in which the maintenance terminal 700 can be authenticated. The memory control section 51$b$ rewrites the mode data stored by the shared memory 51$c$ in response to the instruction received from the wireless section 51$a$. The shared memory 51$c$ stores the mode data. The mode data is normal mode data or maintenance mode data. The memory control section 51$d$ reads out the mode data from the shared memory 51$c$ to apply the mode data to the tampering detection section 52.

The tampering detection section 52 includes, for example, a microcomputer unit and includes a processor and a memory, and is different from the tampering detection section 22 in that a tampering detection program P4 instead of the tampering detection program P3 is stored in the memory thereof. Then, operations of the tampering detection section 52 are realized in such a manner that the processor of the tampering detection section 52 executes the hereafter described processing based on the tampering detection program P4.

Next, operations of the settlement terminal 100 constituted as described above are described. Furthermore, the contents of the processing described below are one example, and various processing capable of obtaining the same result can be suitably utilized.

The maintenance terminal 700 is possessed by a maintainer having authorized authority to maintain the settlement terminal 100 and it sends RF data including authentication information in a case in which the maintenance terminal 700 can communicate with the wireless section 51$a$. For example, a system of a RFID (Radio Frequency Identification) or a NFC (Near Field Communication) can be used for the transmission of RF data. In this way, the wireless section 51$a$ includes a function as a third acquisition module.

For the maintenance of the settlement terminal 100 or at the time of the maintenance of other elements of the LAN 300 or the POS system, it is possible to change the assignment of the IP address to the settlement terminal 100. In a case of carrying out such maintenance, the maintenance person positions the maintenance terminal 700 close to the antenna of the wireless section 51$a$ before the maintenance. Then, RF data is wirelessly sent from the maintenance terminal 700, and the RF data is received by the wireless section 51$a$.

Figure 6:
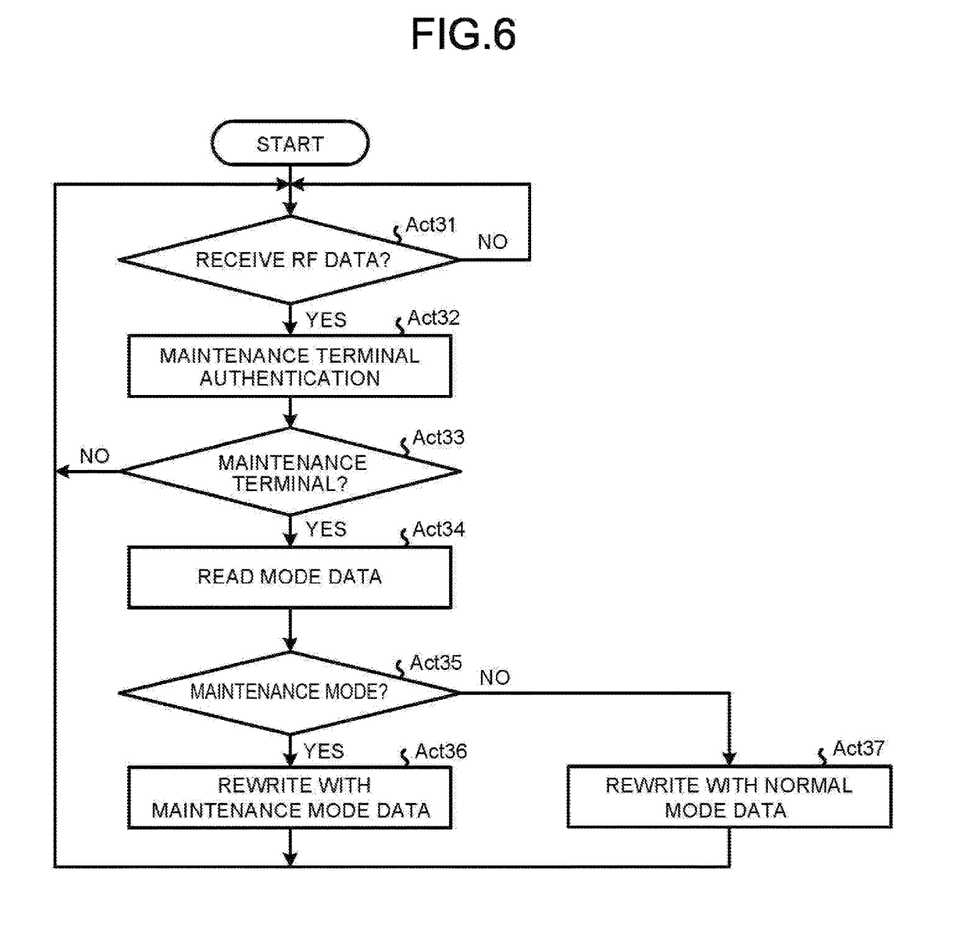
FIG. 6 is a flowchart illustrating an operation of a wireless section shown in FIG. 5.

FIG. 6 is a flowchart illustrating operations of the wireless section 51$a$. The wireless section 51$a$ determines if the RF data is received (Act 31). Then, the wireless section 51$a$ follows the Yes path if the RF data is received, and proceeds to the processing in Act 32.

The wireless section 51$a$ authenticates the maintenance terminal 700 using authentication information included in the RF data (Act 32). The wireless section 51$a$ confirms whether or not the maintenance terminal 700 that sends the RF data is a regular maintenance terminal 700 on the basis of the foregoing authentication (Act 33). Then, the wireless section 51$a$ follows the No path if the maintenance terminal 700 that sends the RF data is not the regular maintenance terminal 700, and returns to the waiting state of Act 31. However, the wireless section 51$a$ follows the Yes path if the maintenance terminal 700 that sends the RF data is the regular maintenance terminal 700, and proceeds to the processing of Act 34.

The wireless section 51$a$ reads the mode data stored in the shared memory 51$c$ via the memory control section 51$b$ (Act 34). The wireless section 51$a$ confirms whether or not the mode data is the maintenance mode data (Act 35). Then, the wireless section 51$a$ proceeds to a processing in Act 36 (follows the Yes path) if the mode data is the maintenance mode data.

In Act 36, the wireless section 51$a$ instructs the memory control section 51$b$ to rewrite the mode data stored by the shared memory 51$c$ with the maintenance mode data. In response to the instruction, the memory control section 51$b$ rewrites the mode data stored by the shared memory 51$c$ with the maintenance mode data. After that, the wireless section 51$a$ returns to the waiting state of Act 31.

On the other hand, the wireless section 51$a$ follows the No path if the mode data read from the sharing memory 51$c$ in Act 35 is the normal mode data, and proceeds to the processing of Act 37. The wireless section 51$a$ instructs the memory control section 51$b$ to rewrite the mode data stored by the shared memory 51$c$ with the normal mode data (Act 37). In response to the instruction, the memory control section 51$b$ rewrites the mode data stored by the shared memory 51c with the normal mode data. After that, the wireless section 51a returns to the waiting state in Act 31.

In this way, each time the maintenance person positions the maintenance terminal 700 close to the antenna of the wireless section 51a, the mode data stored by the shared memory 51c can be replaced by either the normal mode data or the maintenance mode data.

Figure 7:
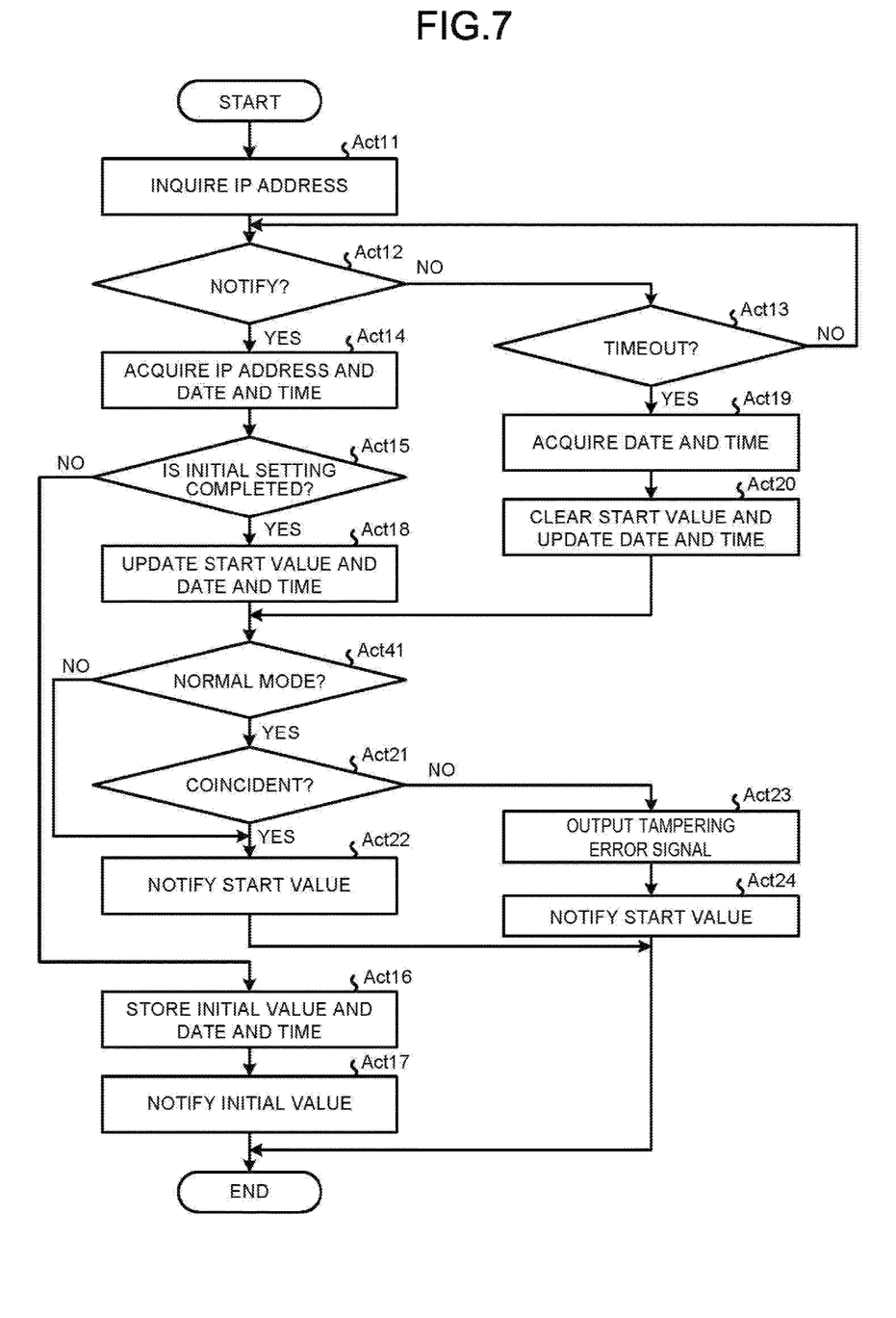
FIG. 7 is a flowchart illustrating an operation of a tampering detection section shown in FIG. 5.

FIG. 7 is a flowchart illustrating procedures of processing based on the tampering detection program P4 in the tampering detection section 52. Furthermore, portions of the illustration of operations of the same contents as these shown in FIG. 4 is omitted, and illustrated operations are applied with the same reference numerals, and detailed description thereof are omitted.

The tampering detection section 52 carries out the processing of Act 11 to Act 20, similar to the tampering detection section 22. Then, the tampering detection section 52 proceeds to processing of Act 41 if the processing of Act 18 or Act 20 is ended. The tampering detection section 52 reads the mode data stored in the shared memory 51c via the memory control section 51d, and confirms whether or not the read mode data is the normal mode data (Act 41). Then, the tampering detection section 52 proceeds to the processing of Act 21 (follows the Yes path) if the read mode data is the normal mode data. Further, the tampering detection section 52 bypasses the processing of Act 21 to proceed to the processing of Act 22 (follows the No path) if the read mode data is the maintenance mode data. After that, the tampering detection section 52 carries out the processing after the processing of Act 21, similar to the tampering detection section 22.

In other words, the tampering detection section 52 does not confirm whether or not the initial value V1 and the start value V2 are coincident, and thus does not carry out the update of the reading program P1 as well as the settlement program P2 in a state in which the maintenance mode is set by setting the mode data to the maintenance mode data. In other words, the tampering detection section 52 includes a function as a second control module.

In this way, according to the settlement terminal 101, the same effect as the settlement terminal 100 can be achieved. In addition, according to the settlement terminal 101, even in a state in which the assignment of the IP address is changed through the maintenance, it can be prevented that the reading program P1 and the settlement program P2 are updated by setting the maintenance mode. In other words, the reading programs and the settlement programs stored in the storage areas 31-1 to 31-n can be effectively used.

Various modifications of the embodiment as described herein are possible. It is possible to execute operations in the same way as described above even in a settlement terminal which carries out a settlement by a method other than the credit settlement such as an electronic money settlement. Further, it is also possible to execute operations by using a wireless tag such as a NFC tag mounted on an electronic money card or a portable information terminal, or storage information stored in any other storage medium instead of the card information in the foregoing embodiment.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A settlement terminal comprising:
    a card reader;
    a settlement processing unit including a processor programmed to carry out a settlement process using information acquired through the card reader and a tampering detection process;
    a storage device in which a first set of programs is stored after encryption by a first key and a second set of programs is stored after encryption by a second key, each set of programs including a first program for operating the card reader, and a second program for carrying out the settlement process, wherein
    upon detection of tampering, the processor of the settlement processing unit notifies an external terminal of the tampering and upon receiving an update instruction from the external terminal, updates a current set of programs used for operating the card reader and carrying out the settlement process from the first set to the second set.

2. The settlement terminal according to claim 1, wherein the tampering detection process includes comparing a start value associated with a current connection state with an initial value associated with a prior connection state, and outputting a tampering error signal if the start value does not match the initial value.

3. The settlement terminal according to claim 2, wherein the start value is an IP address currently assigned to the settlement terminal and the initial value is an IP address previously assigned to the settlement terminal.

4. The settlement terminal according to claim 1, wherein the settlement processing unit is connected to a point-of-sale (POS) terminal over a network to receive transaction data from the POS terminal.

5. The settlement terminal according to claim 4, wherein the external terminal is the POS terminal.

6. The settlement terminal according to claim 1, wherein the storage device includes an encryption processing circuit configured to encrypt the first and second sets of programs using the first and second keys, respectively, prior to storage in a storage area of the storage device and decrypt the first and second sets of programs using the first and second keys, respectively, when they are read out from the storage area.

7. The settlement terminal according to claim 6, wherein the storage device further includes an access control circuit configured to supply the first key to the encryption processing circuit if the first set of programs is the current set of programs and the second key to the encryption processing circuit if the second set of programs is the current set of programs.

8. The settlement terminal according to claim 1, wherein the processor is further programmed to write either normal mode data or maintenance mode data in a shared memory region such that,
    if the normal mode data is written, a tampering error signal is output if a start value associated with a current connection state does not match an initial value associated with a prior connection state, and
    if the maintenance mode data is written, the tampering error signal is not output even if the start value does not match the initial value.

9. The settlement terminal according to claim 8, wherein the settlement processing unit includes a wireless communication interface which sends an instruction to the processor to write maintenance mode data in the shared memory region upon authentication of a maintenance terminal that is within a communication range of the wireless communication interface.

10. A method of protecting data stored in a settlement terminal against tampering, wherein the settlement terminal includes a card reader, a settlement processing unit including a processor programmed to carry out a settlement process using information acquired through the card reader and a tampering detection process, and a storage device in which a first set of programs is stored after encryption by a first key and a second set of programs is stored after encryption by a second key, each set of programs including a first program for operating the card reader, and a second program for carrying out the settlement process, said method comprising:
   performing a tampering detection process;
   upon detection of tampering, notifying an external terminal of the tampering; and
   upon receiving an update instruction from the external terminal, updating a current set of programs used for operating the card reader and carrying out the settlement process from the first set to the second set.

11. The method according to claim 10, wherein the tampering detection process includes comparing a start value associated with a current connection state with an initial value associated with a prior connection state, and outputting a tampering error signal if the start value does not match the initial value.

12. The method according to claim 11, wherein the start value is an IP address currently assigned to the settlement terminal and the initial value is an IP address previously assigned to the settlement terminal.

13. The method according to claim 10, wherein the settlement processing unit is connected to a point-of-sale (POS) terminal over a network to receive transaction data from the POS terminal.

14. The method according to claim 13, wherein the external terminal is the POS terminal.

15. The method according to claim 10, wherein the storage device includes an encryption processing circuit configured to encrypt the first and second sets of programs using the first and second keys, respectively, prior to storage in a storage area of the storage device and decrypt the first and second sets of programs using the first and second keys, respectively, when they are read out from the storage area.

16. The method according to claim 15, wherein the storage device further includes an access control circuit configured to supply the first key to the encryption processing circuit if the first set of programs is the current set of programs and the second key to the encryption processing circuit if the second set of programs is the current set of programs.

17. The method according to claim 10, wherein the processor is further programmed to write either normal mode data or maintenance mode data in a shared memory region such that,
   if the normal mode data is written, a tampering error signal is output if a start value associated with a current connection state does not match an initial value associated with a prior connection state, and
   if the maintenance mode data is written, the tampering error signal is not output even if the start value does not match the initial value.

18. The method according to claim 17, wherein the settlement processing unit includes a wireless communication interface which sends an instruction to the processor to write maintenance mode data in the shared memory region upon authentication of a maintenance terminal that is within a communication range of the wireless communication interface.

* * * * *